United States Patent
Gorman et al.

(10) Patent No.: US 7,139,904 B2
(45) Date of Patent: Nov. 21, 2006

(54) DATA BYTE INSERTION CIRCUITRY

(76) Inventors: J. Zachary Gorman, 14860 SW. Osprey Ct., Beaverton, OR (US) 97007; Richard S. Willardson, 9515 NW. Fleischner St., Portland, OR (US) 97229

( * ) Notice: Subject to any disclaimer, the term of this patent is extended or adjusted under 35 U.S.C. 154(b) by 471 days.

(21) Appl. No.: 10/087,263

(22) Filed: Mar. 1, 2002

(65) Prior Publication Data

US 2003/0167390 A1 Sep. 4, 2003

(51) Int. Cl.
*G06F 7/00* (2006.01)
(52) U.S. Cl. ..................... 712/300; 712/224
(58) Field of Classification Search ............... 712/300, 712/224; 709/236, 246
See application file for complete search history.

(56) References Cited

U.S. PATENT DOCUMENTS

| | | | |
|---|---|---|---|
| 4,285,035 A * | 8/1981 | Kindell et al. ............ 712/210 |
| 5,276,891 A * | 1/1994 | Patel ........................ 712/300 |
| 5,410,682 A * | 4/1995 | Sites et al. ................ 712/300 |
| 5,491,802 A | 2/1996 | Thompson et al. | |
| 5,669,012 A | 9/1997 | Shimizu et al. | |

* cited by examiner

*Primary Examiner*—Henry W. H. Tsai
(74) *Attorney, Agent, or Firm*—Berkeley Law and Technology Group, LLC

(57) ABSTRACT

A data byte insertion circuit includes circuitry to generate derivative intermediate data words from input data words of a current and a preceding cycle, repositioning data bytes of the input data words before and after data byte insertion points of the current and preceding cycles, and circuitry to generate re-aligned variants of insertion data bytes of the current cycle. The data byte insertion circuit further includes circuitry to generate a number of multi-bit data bit selection masks, and circuitry to generate an output data word by conditionally using selected parts of the derivate intermediate data words and the re-aligned variants of the insertion data bytes, in accordance with the multi-bit data bit selection masks.

3 Claims, 10 Drawing Sheets

FIG. 1

DATA BYTE INSERTION CIRCUITRY

BACKGROUND OF THE INVENTION

1. Field of the Invention

The present invention relates to the field of integrated circuits. More specifically, the present invention relates to data byte insertion circuitry.

2. Background Information

Advances in integrated circuit technology have led to the birth and proliferation of a wide variety of integrated circuits, including but not limited to application specific integrated circuits, micro-controllers, digital signal processors, general purpose microprocessors, and network processors. At least some of these integrated circuits are known to have implemented data byte insertion circuitry for inserting data bytes into a stream of data words processed over a number of cycles. Typically, the displaced data bytes in a cycle are stored and tracked, and placed into the appropriate data byte positions of the data word the following cycle. However, experimentation has shown that these typical prior art approaches may not be the most efficient approach, especially with respect to the amount of surface area the circuit consumes, to facilitating data byte insertion of any number of data bytes into any position of a current data word, at any time, in the course of processing a stream of data words over a number of cycles.

As those skilled in the art would appreciate, modern integrated circuits are dense and complex, packing millions of transistors into a very small area. Thus, all reductions in surface area consumption by any circuit are desired.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a data byte insertion circuit for inserting any number of data bytes into an input data word of a current cycle (up to an entire data word), starting at any arbitrary data byte position of the input data word of the current cycle, at any time in the course of processing a stream of data words (e.g. from a data bus) over a number of processing cycles, i.e. in any processing cycle (hereinafter, simply cycle). In other words, the number of data bytes to be inserted in any cycle may be anywhere from zero number of data bytes to a data word, and the insertion data bytes may be inserted before the input data word of the current cycle, after the input data word of the current cycle, or anywhere in between.

For ease of understanding, the present invention will be described in the context of an embodiment where the data word has a word size of eight (8) data bytes. Accordingly, the starting data byte insertion position may assume a value between 0–8, with the value 8 denoting insertion before a data word, and the value 0 denoting insertion after a data word. However, the present invention is not so limited. As will be apparent from the description to follow, the present invention may be practiced with any data word size, as well as employing other conventions to denote the data byte insertion point.

Further, in the following description, various configurations of storage elements and combinatorial logics will be described, to provide a thorough understanding of the present invention. However, the present invention may be practiced without some of the specific details or with alternate storage elements and/or combinatorial logics. In other instances, well-known features are omitted or simplified in order not to obscure the present invention.

The description to follow repeatedly uses the phrase "in one embodiment", which ordinarily does not refer to the same embodiment, although it may. The terms "comprising", "having", "including" and the like, as used in the present application, including in the claims, are synonymous.

Overview

Figure 1:
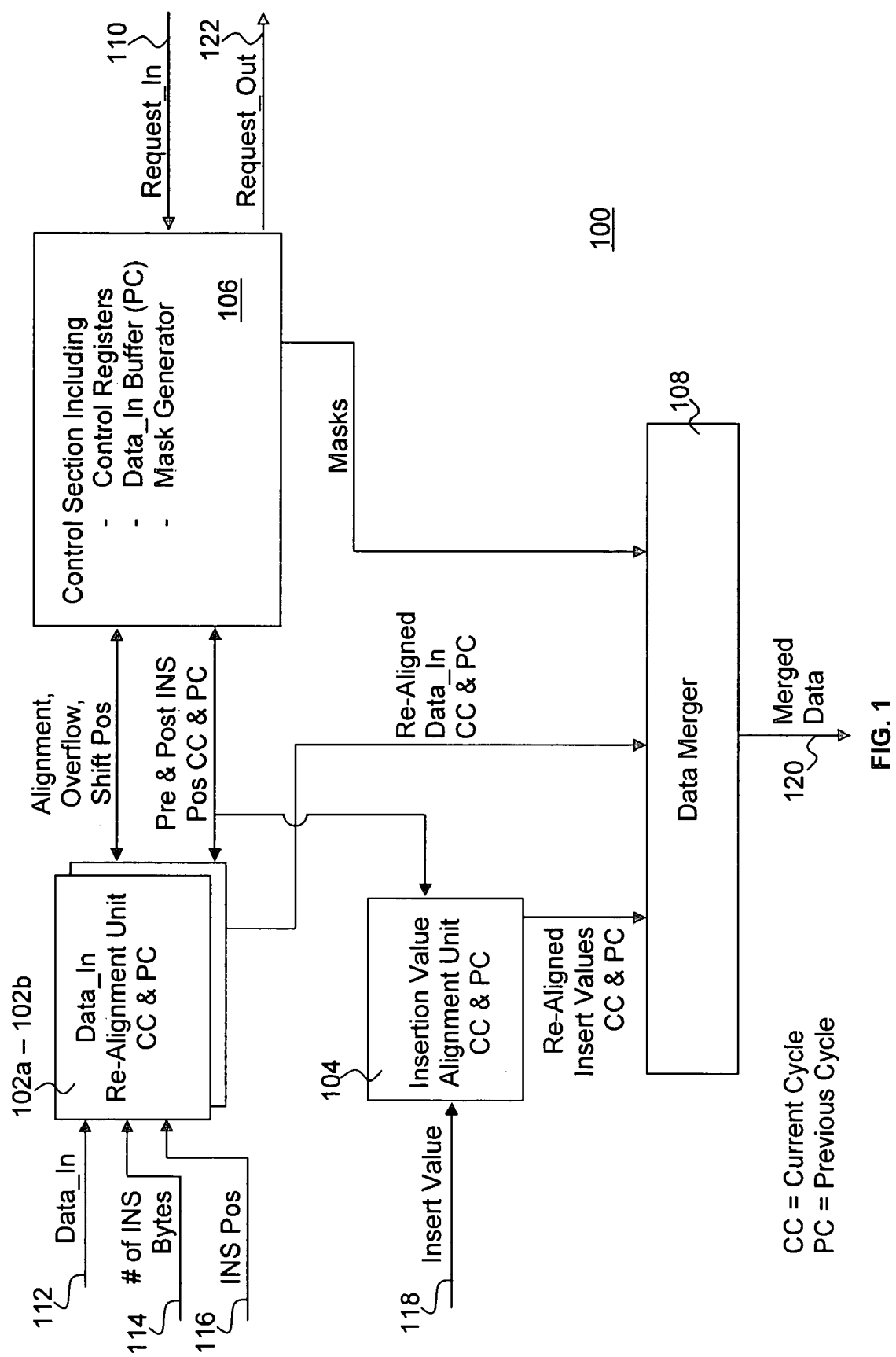
FIG. 1 illustrates an overview of the data byte insertion circuit of the present invention, for inserting any number of data bytes, starting at any arbitrary data byte position of an input data word of a current cycle, at any time in the processing of a stream of data words over a number of processing cycles, in accordance with one embodiment.

Referring now to FIG. 1, wherein a block diagram illustrating an overview of the data byte insertion circuit 100 of the present invention, in accordance with one embodiment, is shown. As illustrated, for the embodiment, data byte insertion circuit 100 of the present invention includes a number of input data word re-alignment units 102a–102b, insertion value alignment unit 104, control section 106 and data merger 108, coupled to one another as shown. More specifically, input data word re-alignment units 102a–102b include two variants of such units, one each for processing an input data word of a current and a preceding cycle.

In each cycle, input signals received by data byte insertion circuit 100 include in particular input data word (data_in) 112, number of data bytes to be inserted in the current cycle (# of ins bytes) 114, the insertion position (ins_pos) 116, and the data bytes to be inserted (insert value) 118. Additionally, the input signals include a data request signal (request_in) 110, when set, denoting a question to insert circuit 100, asking whether another input data word is to be provided in the next cycle. The output signals include merged data 120, i.e. modified data_in reflecting the data bytes to be inserted (if any), and a request_out signal 122, when set, denoting that additional input data word is to be provided in the next cycle.

In other words, in the course of processing a stream of data words over a number of cycles, data byte insertion circuit 100 may be involved to insert successive quantities of data bytes into the stream of data words. As those skilled in the art would appreciate, once data byte insertion circuit 100 is involved to insert the first group of data bytes, typically some data bytes of the then current data word will be displaced, and has to be cascaded into the subsequent data words. The displacement effect continues until eventually the cumulative displacement effects of the successive quantities of data bytes inserted result in a net of zero data bytes being displaced into the data word of the next cycle. At such time, data byte insertion circuit 100 may deassert request_out 122, and involvement of circuit 100 in the processing of the stream of data words may cease, until the next group of data bytes to be inserted are encountered.

Note that in any cycle, data_in 112, # of ins bytes 114, ins pos 116 and insert value 118 may all be zero, while data byte insertion circuit 100 is still involved in the processing of the stream of data words, to cascade down the displacement effect of the earlier insertion or insertions.

Continuing to refer to FIG. 1, input data word re-alignment unit 102a for the input data word of a current cycle is employed to generate two intermediate data words, one each for the data bytes before the data byte insertion point of the current cycle and the data bytes after the data byte insertion point the current cycle. More specifically, the two intermediate data words include the two groups of data bytes repositioned within the two intermediate data words respectively. The data bytes before the data byte insertion point of the current cycle (which may be none) are re-positioned within one of the intermediate data words reflecting the net alignment impacts cascaded from prior cycles (up through the preceding cycle), whereas the data bytes after the data byte insertion point of the current cycle (which may be none) are re-positioned within the other intermediate data word reflecting the net alignment impacts cascaded from prior cycles (up through the preceding cycle) as well as the number of data bytes to be inserted in the current cycle (which may be none). In one embodiment, only the first intermediate data word (of the 3 data words resulted from the operation) is saved, to reduce hardware requirement.

Similarly, input data word re-alignment unit 102b for the input data word of a preceding cycle is employed to generate two additional intermediate data words, one each for the data bytes before the data byte insertion point of the preceding cycle (which may be none) and the data bytes after the data byte insertion point the preceding cycle (which may be none). More specifically, the two additional intermediate data words include the two groups of data bytes (if applicable) repositioned within the two additional intermediate data words respectively. The data bytes before the data byte insertion point of the preceding cycle (if any) are re-positioned within one of the additional intermediate data words reflecting the net alignment impacts cascaded from cycles prior to the preceding cycle, whereas the data bytes after the data byte insertion point of the preceding cycle (if any) are re-positioned within the other additional intermediate data word reflecting the net alignment impacts cascaded from cycles prior to the preceding cycle as well as the number of data bytes to be inserted in the preceding cycle (if any). In one embodiment, only the second intermediate data word (of the 3 data words resulted from the operation) is saved, to reduce hardware requirement.

In other words, unlike the prior art, where the data bytes displaced in a cycle as a result of an insertion are stored and tracked, and then placed into the data word of the following cycle accordingly, under the present invention, to determine the output data word of each cycle, the insertion effect, if any, of the preceding cycle is re-determined concurrently as the insertion effect, if any, of the current cycle is being determined. Experimentation shows that the re-determination approach of the present invention actually results in a circuit that consumes less surface area of an integrated circuit.

Still referring to FIG. 1, insertion value alignment unit 104 is employed to realign the insertion data word of the current cycle (if any), in at least two ways, generating two variants of the realigned insertion values for use in the determination of the insertion impacts to the data word of the current and the preceding cycle.

Control section 106, as will be described in further detail later, includes a number of control registers (and their associated circuitry), a data buffer, and a mask generator. The control registers are employed to store a number of control information, including in particular, net alignment impact cascaded from prior cycles, and whether an overflow condition occurred in the preceding cycle. The data buffer is employed to store the input data word of the preceding cycle, to facilitate the earlier described concurrent re-determination of the insertion impact (if any) of the preceding cycle. The mask generator, as will be described in more detail later, is employed to generate a number of multi-bit data bit selection masks for use by data merger 108 to form output data word 120 of each cycle.

Data merger 108 accordingly, is employed to form output data word 120 of each cycle, conditionally using selected portions of the intermediate data words generated by input data word alignment unit 102, and re-aligned insertion data bytes generated by insertion value alignment unit 104, in accordance with the multi-bit data bit selection masks generated by the mask generator of control section 106.

At least one embodiment each of the various units and sections, including the manner they cooperate with each other, will be described in more detail in turn below.

Input Data Word Alignment Unit

Figure 2A:
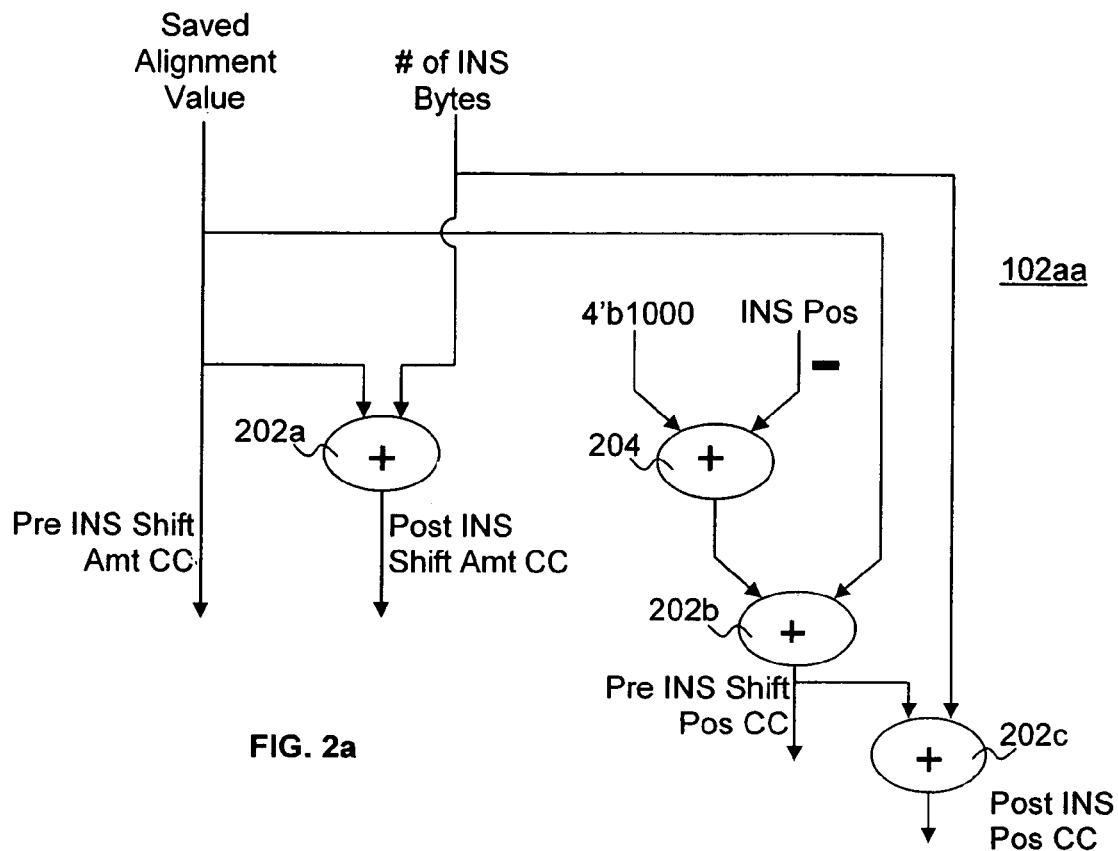
FIGS. 2a–2b illustrate the input data word alignment unit of FIG. 1 for re-aligning an input data word of a current cycle in further detail, in accordance with one embodiment.
Figure 2B:
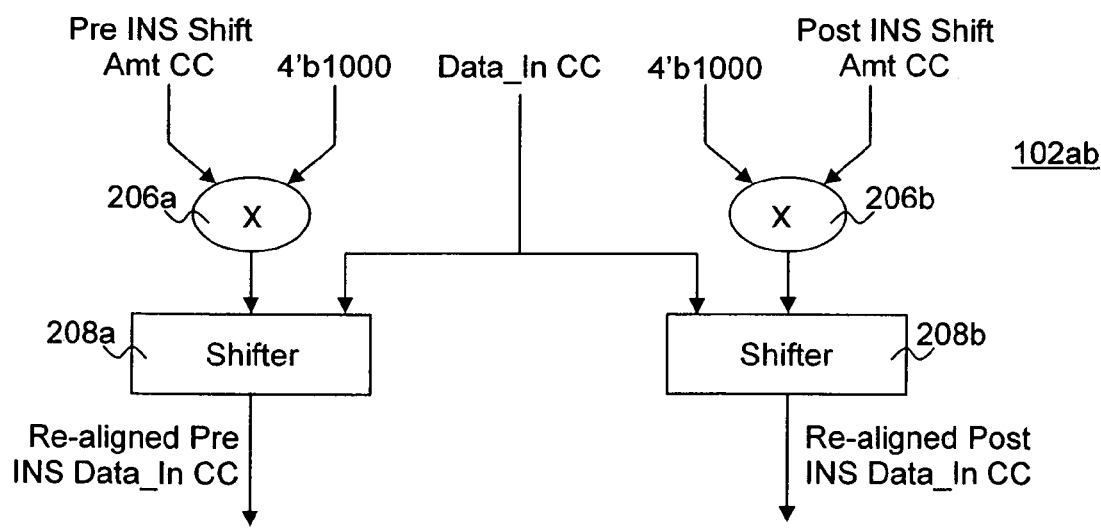

FIGS. 2a–2b illustrate the input data word re-alignment unit 102a for generating the intermediate data words with the data bytes preceding and following the data byte insertion point of the current cycle (if any) repositioned appropriately within the intermediate data words, in further detail, in accordance with one embodiment. As alluded to earlier, the embodiment assumes the size of each data word processed in each cycle to be 64 bits (eight (8) bytes). Further, the data byte insertion position is denoted in an unconventional manner with the data byte insertion position "8" denoting that the insertion is to be made before the input data word of the current cycle, and "0" denoting that the insertion is to be made after the input data word of the current cycle. However, these are not limitations to the present invention, which may be practiced with data words of larger or smaller sizes, and with alternate conventions in denoting the data byte insertion position.

As illustrated in FIG. 2a–2b, input data word re-alignment unit 102a for generating the intermediate data words comprises two portions, portion 102aa and 102ab. Portion 102aa is employed to generate a pre-insertion data byte position of the current cycle (pre ins pos cc), a post-insertion data byte position of the current cycle (post ins pos cc), a pre-insertion shift amount of the current cycle (pre ins shift amt cc) and a post-insertion shift amount of the current cycle (post ins shift amt cc); whereas portion 102ab is employed to use the above described pointers and shift amounts of the current cycle to generate the two earlier described intermediate data words of the current cycle.

Pre-insertion data byte position of the current cycle (pre ins post cc) points to the data byte position after which the insertion data bytes of the current cycle (if any) are to be made. Post-insertion data byte position of the current cycle (post ins pos cc) points to the data byte position at which the insertion data bytes of the current cycle end. Pre-insertion shift amount of the current cycle (pre ins shift amt cc) denotes the amount of shifting (in units of data bytes) to be applied to the input data word of the current cycle to generate the intermediate data word having the pre-insertion data bytes of the input data word of the current cycle (if any) re-positioned appropriately. Post-insertion shift amount of the current cycle (post ins shift amt cc) denotes the amount of shifting (in units of data bytes) to be applied to the input data word of the current cycle to generate the intermediate data word having the post-insertion data bytes of the input data word of the current cycle (if any) re-positioned appropriately.

As illustrated in FIG. 2a, portion 102aa includes a number of arithmetic operators 202a–202 c and 204 coupled to the one another as shown. In particular, for the embodiment, arithmetic operators 204 and 202b are employed to subtract the data byte insert position (ins pos) from the data word size "8" (in units of data bytes) and then add the difference to a saved net alignment impact cascaded from prior cycles to generate the earlier described pre-insertion point of the current cycle (pre ins pos cc). As will be described in more detail below, the net alignment impact cascaded from prior cycles (up through the preceding cycle) is saved in one of the control registers of control section 106 (and subsequently obtained there from).

Arithmetic operator 202c facilitates adding the number of the data bytes being inserted in the current cycle to the "pre insertion" pointer to generate the post-insertion point of the current cycle (post ins pos cc).

Further, the saved net alignment impact cascaded from prior cycles is outputted as the pre-insertion data byte shift amount for the current cycle (pre ins shift amt cc), and the saved net alignment impact, having the number of insert data bytes added to it, is outputted as the post-insertion data byte shift amount for the current cycle (post ins shift amt cc).

As illustrated in FIG. 2b, portion 102ab includes a number of additional arithmetic operators 206a–206 b and a number of shifters 208a–208 b correspondingly coupled to the arithmetic operators 206a–206 b. Arithmetic operator 206a multiplies the pre-insertion data byte shift amount by "8" (number of bits in a data byte). The result is used by shifter 208a to shift the input data word of the current cycle (data_in cc) accordingly, generating the intermediate data word (realigned pre ins data_in cc) having the data bytes of the current input data word preceding the data byte insertion point of the current cycle (if any) re-positioned appropriately.

In like manner, arithmetic operator 206b multiplies the post-insertion data byte shift amount by "8" (number of bits in a data byte). The result is then used by shifter 208b to shift the input data word of the current cycle (data_in cc) accordingly, generating the intermediate data word (realigned post ins data_in cc) having the data bytes of the current input data word following the data byte insertion point of the current cycle (if any) re-positioned appropriately.

Figure 3A:
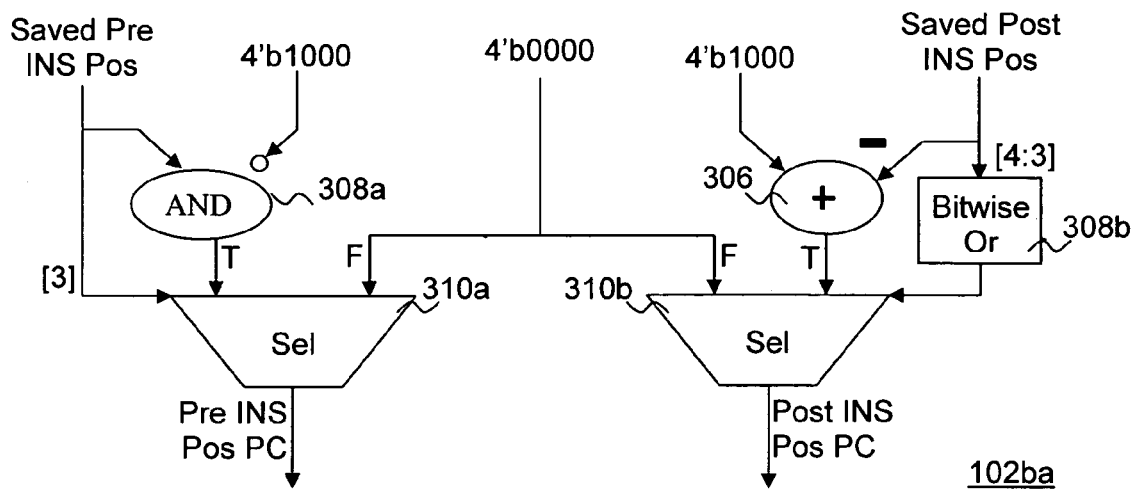
FIGS. 3a–3c illustrate the input data word alignment unit of FIG. 1 for re-aligning an input data word of a preceding cycle in further detail, in accordance with one embodiment.

FIGS. 3a–3 c illustrate the input data word alignment unit 102b for generating the intermediate data words with the data bytes preceding and following the data byte insertion point of the preceding cycle (if any) repositioned appropriately within the intermediate data words, in further detail, in accordance with one embodiment. As set forth earlier, the embodiment assumes the size of each data word processed in each cycle to be 64 bits (eight (8) bytes), and the data byte insertion position is denoted as earlier described.

As illustrated in FIG. 3a–3 c, input data word alignment unit 102b for generating the intermediate data words comprises three portions, portion 102ba, portion 102bb, and portion 102bc. Portion 102ba, similar to part of its counterpart, portion 102aa of input data word alignment unit 102 a, is employed to generate a pre-insertion data byte position of the preceding cycle (pre ins pos pc) and a post-insertion data byte position of the preceding cycle (post ins pos pc). Portion 102bb, similar to the other part of its counterpart, portion 102aa of input data word alignment unit 102a, is employed to generate a pre-insertion shift amount of the preceding cycle (pre ins shift amt pc) and a post-insertion shift amount of the preceding cycle (post ins shift amt pc). Portion 102bc, similar to its counterpart, portion 102ab of input data word alignment unit 102a, is employed to use the these pointers and shift amounts of the preceding cycle to generate the two earlier described intermediate data words of the preceding cycle.

Pre-insertion data byte position of the preceding cycle (pre ins pos pc) points to the data byte position after which the insertion data bytes of the preceding cycle (if any) were made. Post-insertion data byte position of the preceding cycle (post ins pos pc) points to the data byte position at which the insertion data bytes of the preceding cycle ended. Pre-insertion shift amount of the preceding cycle (pre ins shift amt pc) denotes the amount of shifting (in units of data bytes) to be applied to the input data word of the preceding cycle to generate the intermediate data word having the pre-insertion data bytes of the input data word of the preceding cycle (if any) re-positioned appropriately. Post-insertion shift amount of the preceding cycle (post ins shift amt pc) denotes the amount of shifting (in units of data bytes) to be applied to the input data word of the preceding cycle to generate the intermediate data word having the post-insertion data bytes of the input data word of the preceding cycle (if any) re-positioned appropriately.

As illustrated in FIG. 3a, portion 102ba includes an arithmetic operator 306, a number of logic operators 308 a –308 b and a number of selectors 310a –310 b coupled to the one another as shown. In particular, for the embodiment, logical operator 308a is employed to perform a logical AND operation on a saved pre-insertion data byte position (saved pre ins pos) and a complement of the data word size expressed in binary form (4'b1000 for the embodiment). In turn, the saved pre-insertion data byte position (saved pre ins pos) is employed by selector 310a to select either the result of the above described AND operation or zero (4'b0000), and output the selected value as the pre-insertion data byte position of the preceding cycle (pre ins pos pc). More specifically, selector 310a selects the result of the above described logical AND operation, and outputs the result as the pre-insertion data byte position of the preceding cycle, if the most significant bit of the saved pre-insertion data byte position amount (bit[3]) is set. Otherwise, selector 310a selects the zero value, and outputs as the pre-insertion data byte position of the preceding cycle.

Arithmetic operator 306 is employed to subtract a saved post insertion data byte position (saved post ins pos) from the data word size in units of data bytes (4'b1000 for the embodiment). Logical operator 308 b is employed to perform a bitwise OR logical operation on bits of [4:3 ]the saved post insertion data byte position (saved post ins pos). The result of the bitwise OR operation, is in turn used by selector 310b to select either the difference of the above described subtraction operation performed by arithmetic operator 306 or, zero (4'b0000), and output the selected value as the post-insertion data byte position of the preceding cycle (post ins pos pc). More specifically, selector 310b selects the result of the above described arithmetic operation, and outputs the result as the post insertion data byte position of the preceding cycle, if the result of the bitwise OR operation is set. Otherwise, selector 310b selects the zero value, and outputs as the prost insertion data byte position of the preceding cycle.

Figure 3B:
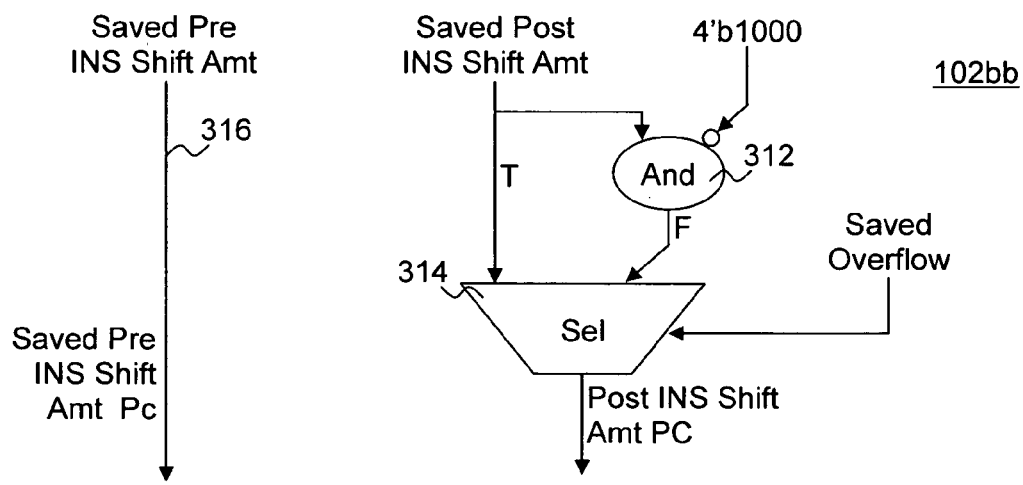

As illustrated in FIG. 3b, portion 102bb includes a logic operator 312 and a selector 314 coupled to the one another as shown. Portion 102bb also includes signal line 316 for receiving a saved pre-insertion shift amount from control section 106, and outputting the value as pre-insertion shift amount of the preceding cycle (pre ins shift amt pc). Logical operator 312 is employed to perform a logical AND operation on a saved post-insertion shift amount (saved post ins shift amt) with a complement of the data word size in units of data bytes (4'b10000 for the embodiment). Selector 314 uses a saved overflow indicator received from control section 106 to select either the saved post-insertion shift amount or the result of the above described logical AND operation performed by logical operator 312, to output as the post insertion shift amount for the preceding cycle (post ins shift amt pc). More specifically, selector 314 selects the saved post-insertion shift amount and outputs as the post insertion shift amount for the preceding cycle, if the saved overflow indicator does not indicate an overflow. Otherwise, selector 314 selects the result of the above described logical AND operation, and outputs as the post insertion shift amount for the preceding cycle.

Figure 3C:
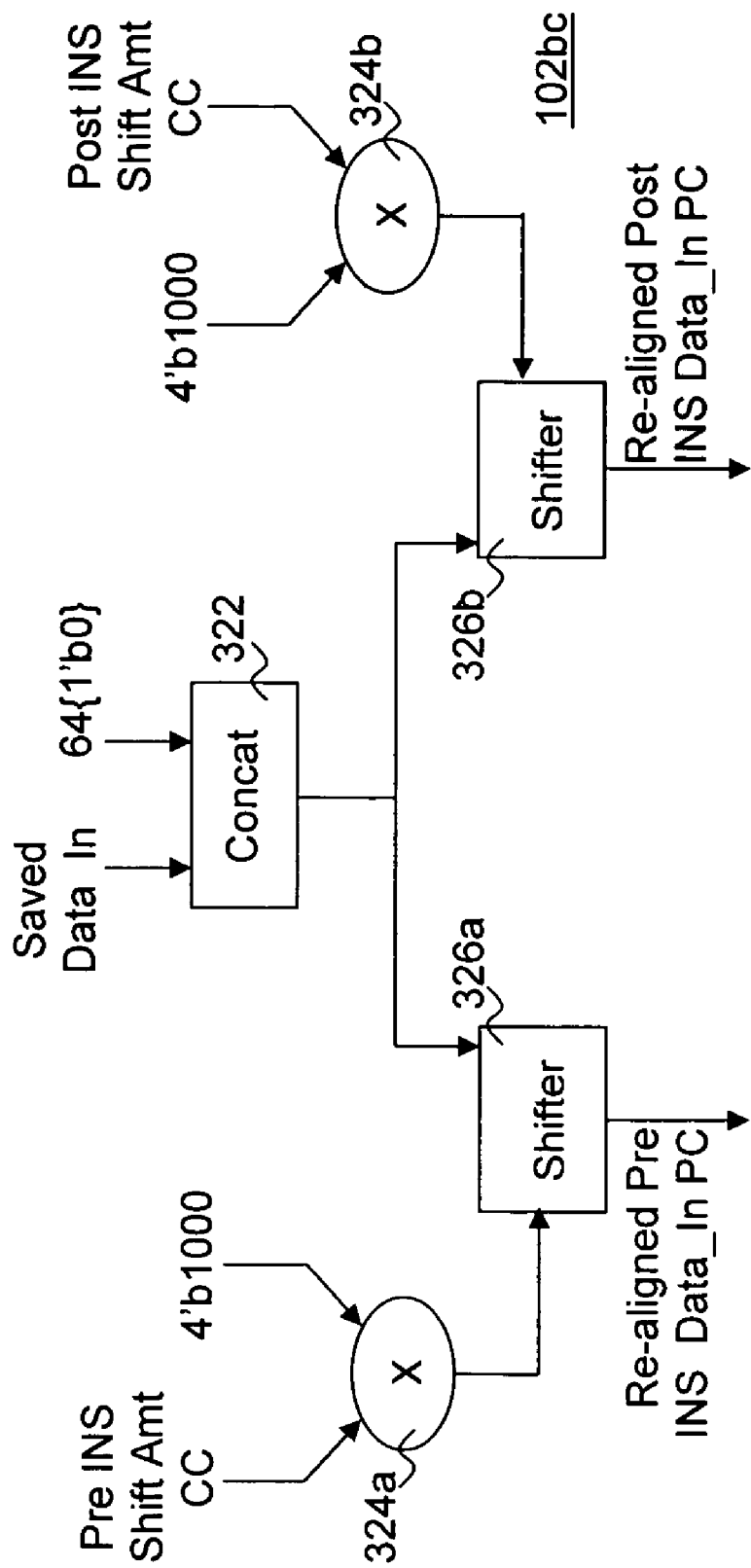

As illustrated in FIG. 3c, portion 102bc includes concatenator 322, a number of additional arithmetic operators 324a–324 b and a number of shifters 326a–326 b correspondingly coupled to concatenator 322 and arithmetic operators 324a–324 b. Concatenator 322 is employed to concatenate the saved data word of the preceding cycle (saved data_in) with equal number of zero bits (64{1'b0} for the embodiment). Arithmetic operators 324a–324 b multiply the pre-insertion and post-insertion data byte shift amount generated by portion 102bb by the data word size in units of data bytes (4'b1000 for the embodiment) respectively. The results are used by shifters 326a and 326b to shift the result of the concatenation operation to generate the intermediate data words (realigned pre ins data_in pc and realigned post ins data_in pc) having the pre-insertion and post-insertion data bytes of the input data word of the preceding cycle (if any) re-positioned appropriately.

Insertion Value Alignment Unit

Figure 4A:
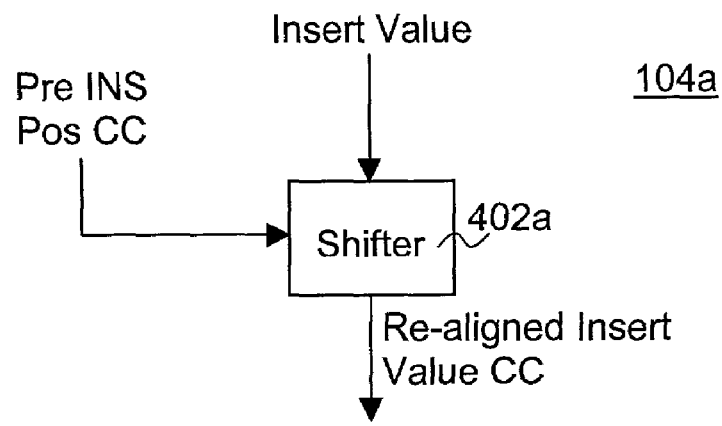
FIGS. 4a–4b illustrate the insertion data byte alignment unit of FIG. 1 for re-aligning a number of insertion data bytes in further detail, in accordance with one embodiment.

FIGS. 4a–4 b illustrate insert value alignment unit 104 of FIG. 1 in further detail, in accordance with one embodiment. As illustrated, insert value alignment unit 104 comprises two portions, portion 104a and portion 104b. Portion 104a is employed to generate a realigned variant of the insert value of the current cycle with the insert data bytes of the current cycle properly realigned within the realigned insert value. Portion 104b is employed to generate a realigned variant of the insert value of the preceding cycle with the insert data bytes of the preceding cycle properly realigned within the realigned insert value.

As illustrated in FIG. 4a, portion 104a comprises shifter 402a for shifting the insert value of the current cycle based on the earlier described pre-insertion data byte position of the current cycle generated by input data word alignment unit 102a, and outputting the shifted insert value as one realigned variant of the insert value of the current cycle.

Figure 4B:
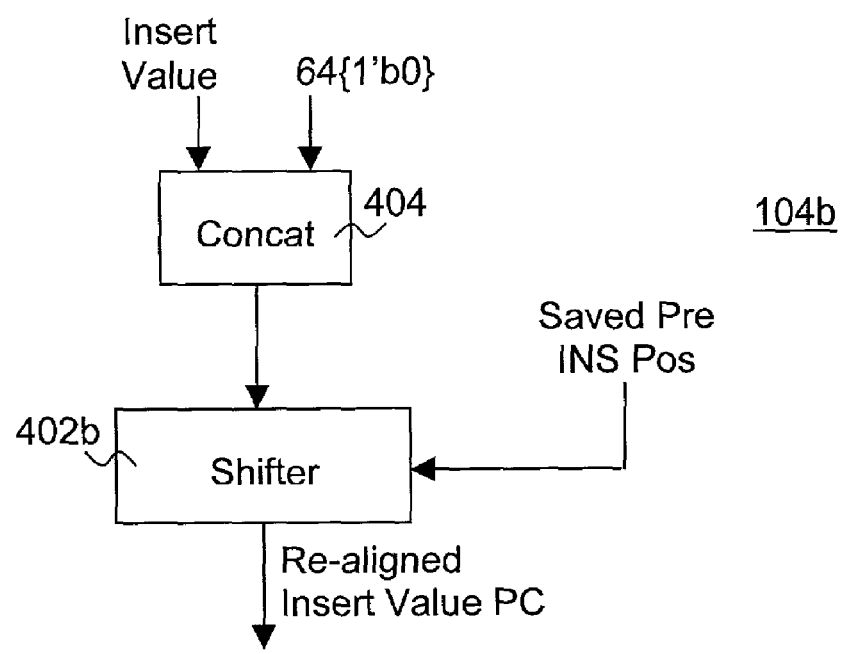

As illustrated in FIG. 4b, portion 104b comprises concatenator 404 and shifter 402b coupled to each other as shown. For the embodiment, concatentor 404 concatenates the insert value of the current cycle to a data word of zero value (64{1'b0} for the embodiment), and shifter 402b shifts the concatenated result based on a saved pre-insertion data byte position value, and outputs the result as another realigned variant of the insert value of the current cycle.

Control Section

Figure 5A:
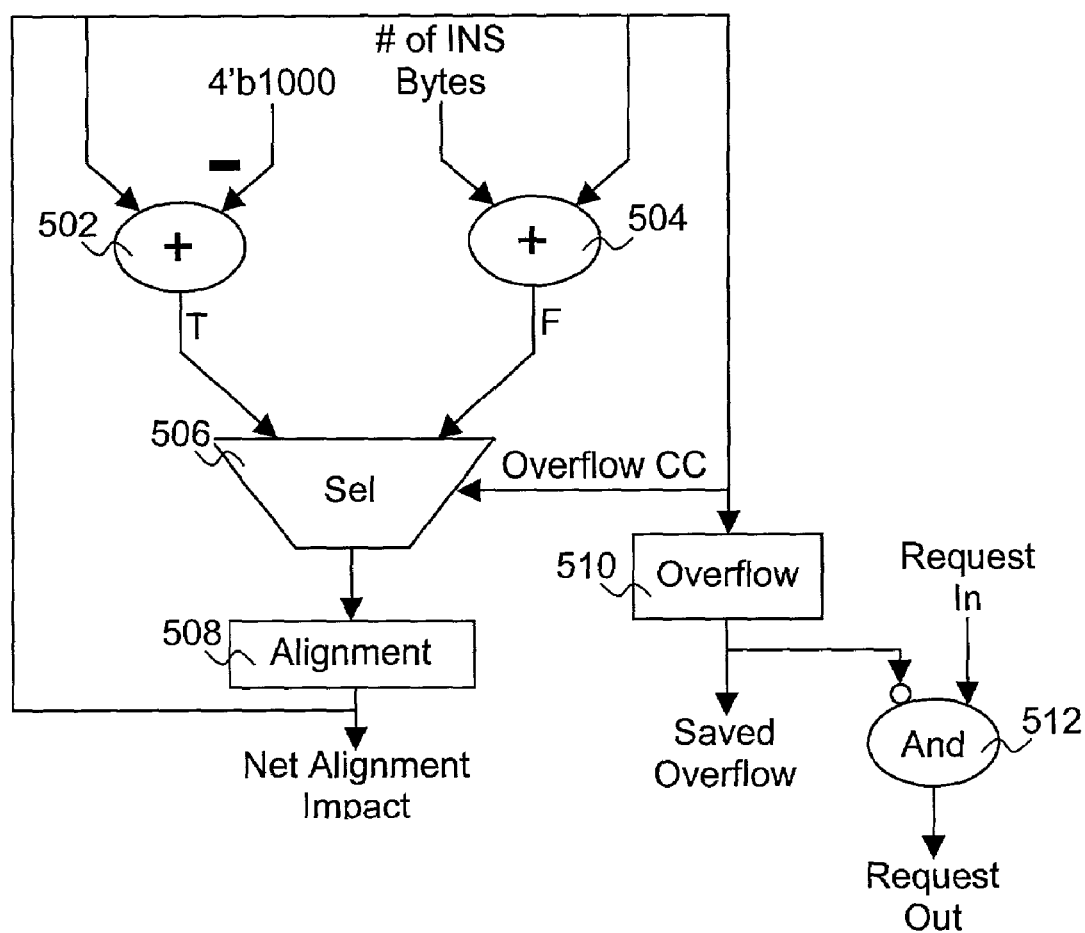
FIGS. 5a–5b illustrate the control registers of the control section of FIG. 1, for storing control information, and their associated circuitry, in further detail, in accordance with one embodiment.

FIGS. 5a–5 d illustrate the relevant elements of control section 106, in accordance with one embodiment. More specifically, FIGS. 5a–5 d illustrate certain control registers and their associated circuitry, a data buffer and its associated circuitry, and a mask generator, of control section 106 respectively.

As illustrated in FIG. 5a,control section 106 includes alignment register 508 and overflow register 510 for storing the earlier mentioned saved net alignment impact value, and the overflow indicator. Further, associated with these registers are arithmetic operators 502 and 504, logical operator 512, and selector 506. Arithmetic operator 502 is employed to subtract the data word size in units of data bytes (4'b1000 for the embodiment) from the previous saved net alignment impact, whereas arithmetic operator 504 adds the number of data bytes to be inserted in the current cycle (if any) to the previous saved net alignment impact. Selector 506 is employed to select one of these values for saving as the next saved net alignment impact, based on the most significant bit [3] of the previous saved net alignment impact. As illustrated, the most significant bit [3] of the previous saved net alignment impact is saved as overflow indicator. Thus, selector 506 selects among the two input values depending on whether an overflow condition exists. If the overflow condition exists, selector 506 selects the output of operator 502. Otherwise, selector 506 selects the output of operator 504.

Further, in each cycle, logical operator 512 is employed to perform a logical AND operation on the complement of the overflow indicator and request_in signal 110, and outputs the result as the earlier described request_out signal 122, denoting whether an additional data word is to be provided to data byte insert circuit 100 in the next cycle.

Figure 5B:
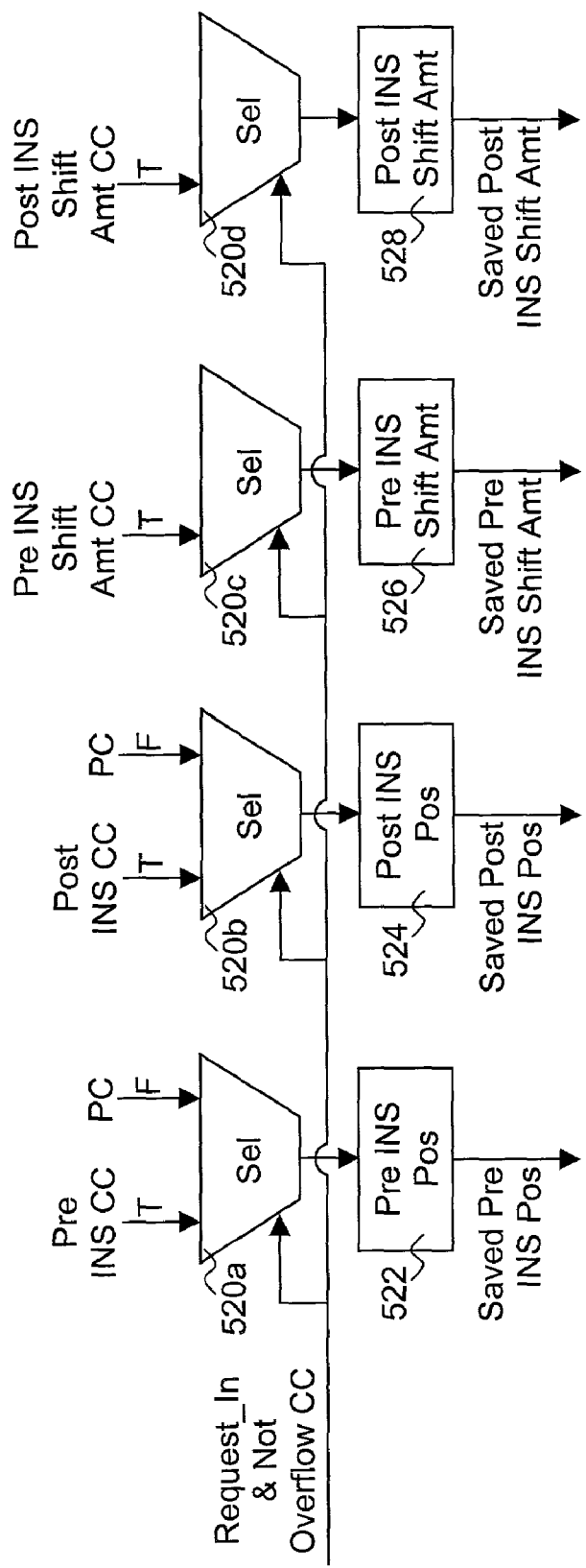
Figure 5C:
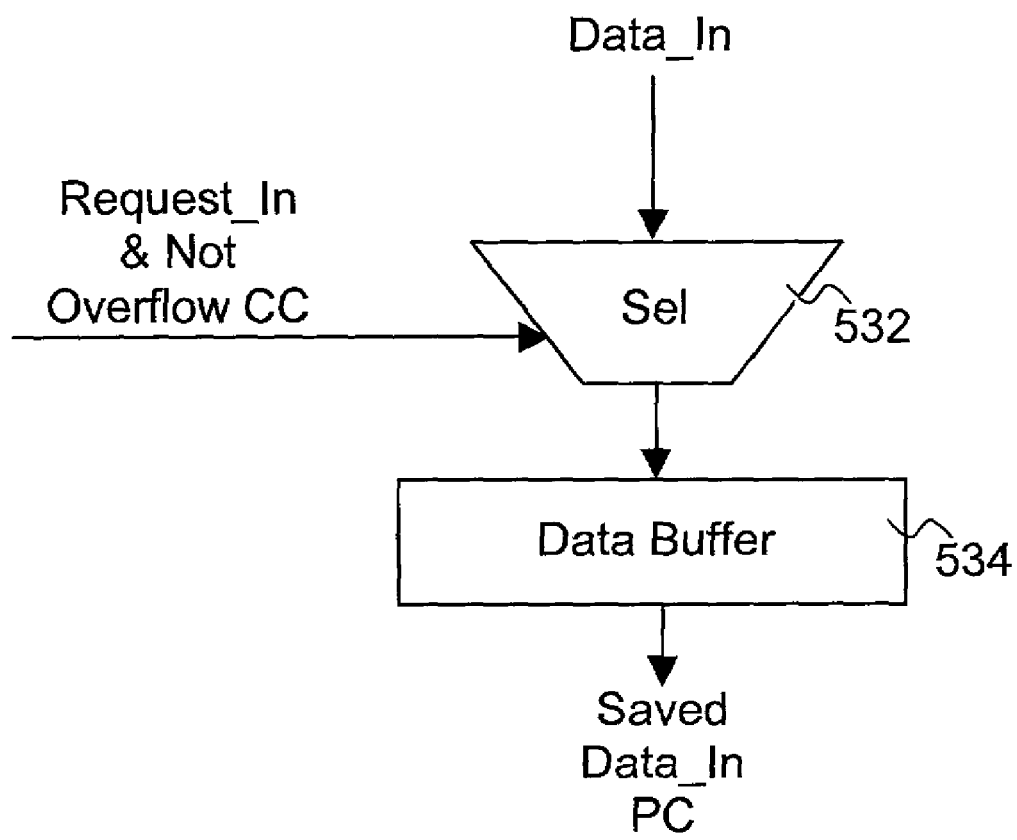
FIG. 5c illustrates the data buffer of the control section of FIG. 1, for storing a copy of an input data word of a preceding cycle, and its associated circuitry, in further detail, in accordance with one embodiment.

As illustrated in FIG. 5b, control section 106 also includes registers 522–528, and selectors 520 a –520 d correspondingly coupled to each other. Registers 522 and 524 are employed to store the earlier mentioned saved pre-insertion and post-insertion data byte positions respectively, whereas registers 526 and 528 are employed to store the earlier mentioned saved pre-insertion and post-insertion shift amount respectively. Each of selectors 520a–520 d selects an appropriate one of its input values for saving as the saved pre-insertion and post-insertion data byte positions, and the saved pre-insertion and post-insertion shift amounts, based on the state of the request_in 110 and the current overflow condition. More specifically, if request_in 110 is set, and the overflow condition does not exist, each of selectors 520*a*–520 *d* selects the corresponding value of the current cycle, i.e. the pre-insertion and post-insertion data byte positions of the current cycle, and the pre-insertion and post-insertion shift amount of the current cycle. If the overflow condition exists, selectors 520*a*–520 *b* select and save the corresponding values of the preceding cycle instead. No shift amount is selected and saved for registers 526 and 528. As illustrated in FIG. 5*c*, control section 106 also includes buffer 534 and selector 532 coupled to each other. Buffer 534 is employed to store the input data word of the preceding cycle. Selector 532 is employed to facilitate the saving when the request_in signal 110 is set, and there is no overflow condition.

Figure 5D:
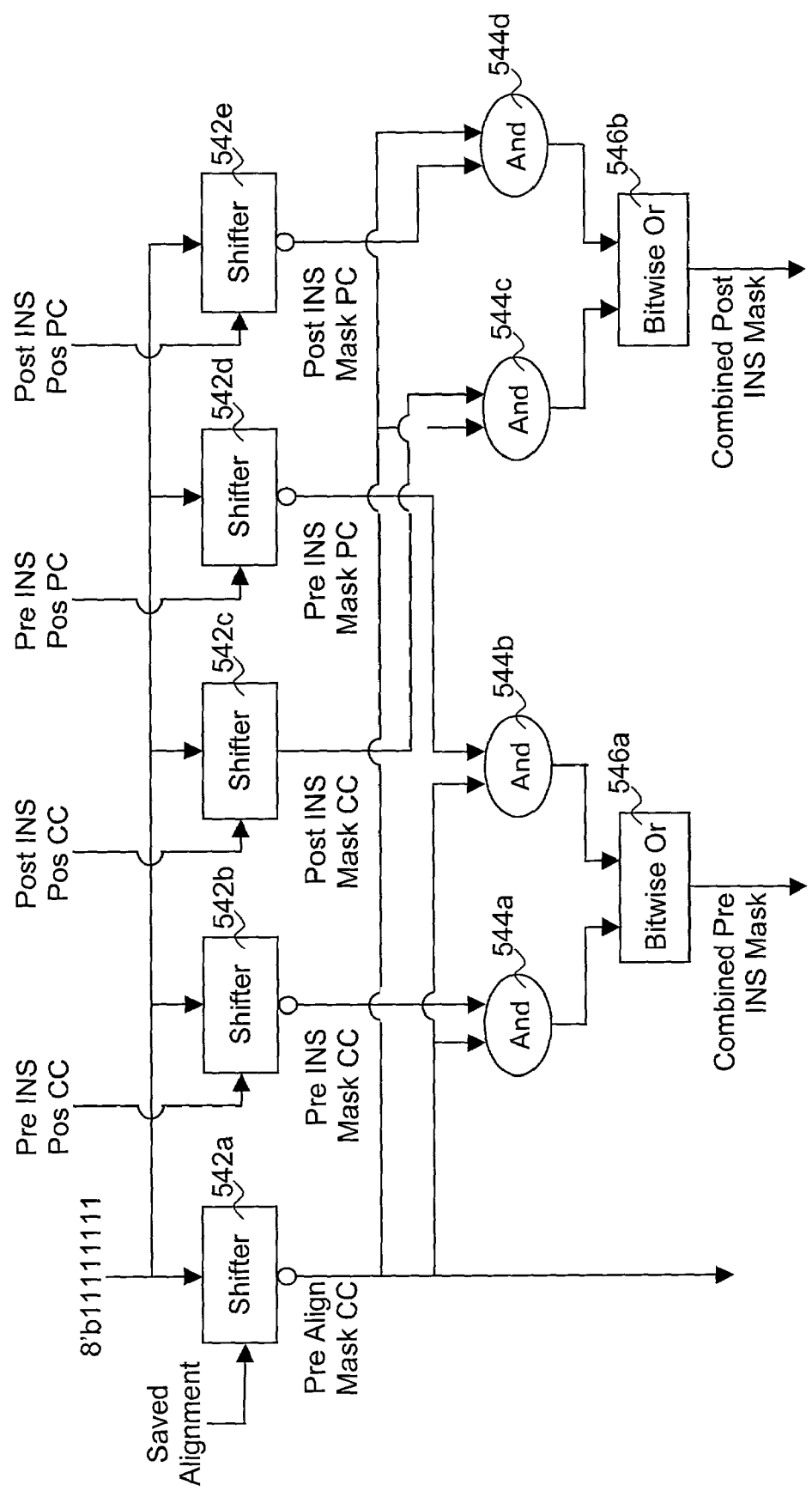
FIG. 5d illustrates the data bit selection mask circuitry of the control section of FIG. 1, for generating a number of multi-bit data bit selection masks, in further detail, in accordance with one embodiment.

As illustrated in FIG. 5*d*, the mask generator of control section 106 includes a number of shifters 542*a*–542*e* and a number of logical operators 554*a*–544*d* and 546*a*–546*b*, coupled to each other as shown. Shifters 542*a*–542 *e* are employed to shift a data word of 1-bits based on the saved net alignment impact, the pre-insertion data byte position of the current cycle, the post-insertion data byte position of the current cycle, pre-insertion data byte position of the preceding cycle, and the post-insertion data byte position of the preceding cycle respectively.

The output of shifter 542*a* is output as the pre-alignment mask of the current cycle. The outputs of shifters 542*b* and 542*c* are AND'd with the output of shifter 542*a*, using logical operators 544*a* and 544*b*; and a bitwise OR operation is performed on the results, using logical operator 546*a*. The result is outputted as the combined pre-insertion data byte mask.

In like manner, the outputs of shifters 542*d* and 542*e* are AND'd with the output of shifter 542*a*, using logical operators 544*c* and 544*d*; and a bitwise OR operation is performed on the results, using logical operator 546*b*. The result is outputted as the combined post-insertion data byte mask.

As will be described in more detail below, the three masks, pre-align mask of the current cycle, and the two combined masks are employed to conditionally select the different parts of the earlier described intermediate data words, and re-aligned variants of the insert value, to form the output data word of the current cycle.

Data Merge

Figure 6:
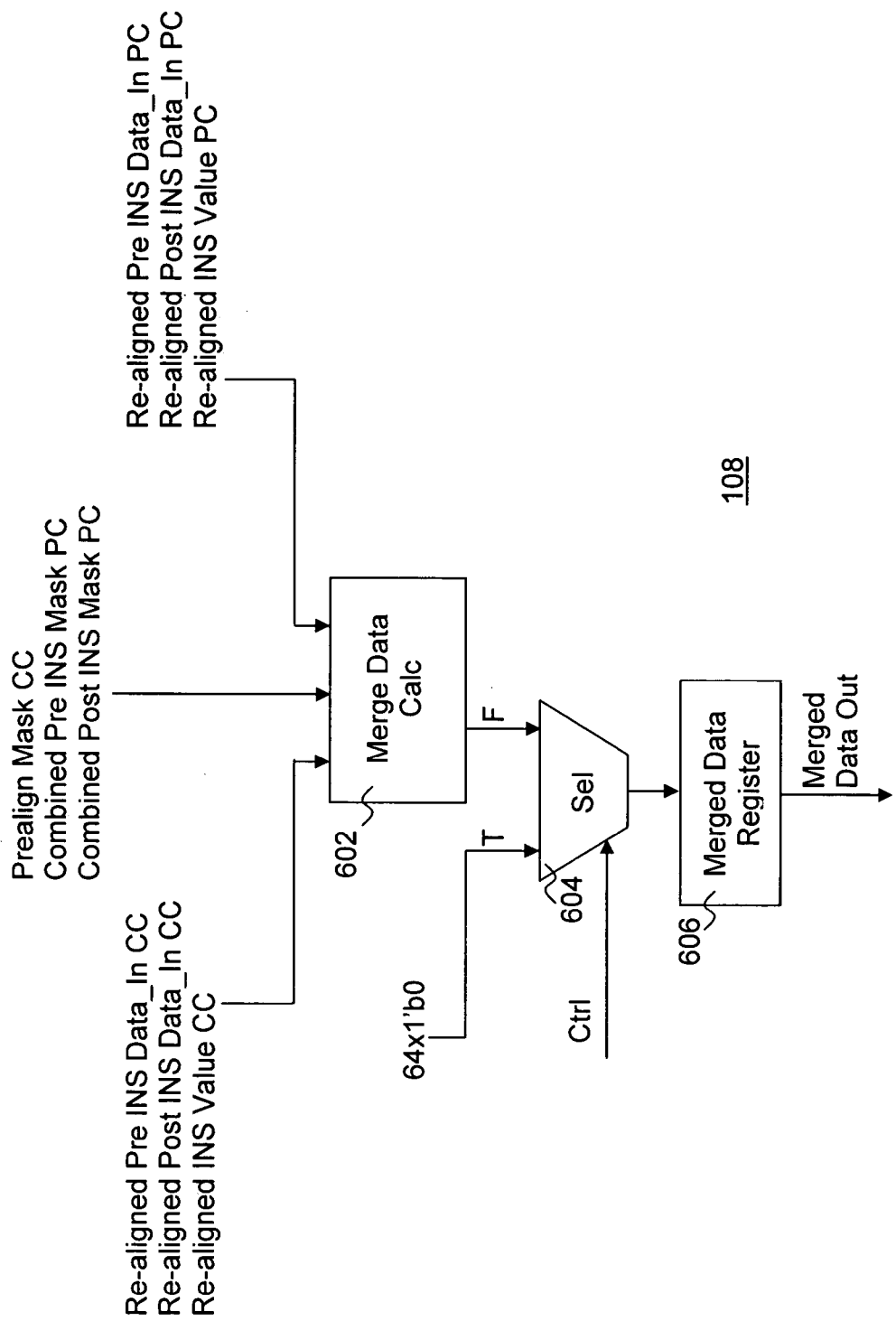
FIG. 6 illustrates the data merging portion of the data byte insertion circuit of FIG. 1 in further detail, in accordance with one embodiment.

FIG. 6 illustrates data merger 108 of FIG. 1 in further detail, in accordance with one embodiment. As illustrated, data merger 108 includes merge data calculation circuit 602, selector 604 and output register 606, coupled to each other as shown. Output register 606 is employed to hold the merged data word to be outputted. Selector 604 is employed to select the zero value to initialize output register 606 during power on/reset, and select the output of calculation circuit 602 for saving into output register 606 to form the output data word.

As alluded to earlier and illustrated, calculation circuit 602 forms the output data word by conditionally employing selected parts of the intermediate data words, and the re-aligned variants of the insert value, in accordance with the multi-bit data bit selection masks described earlier. More specifically, calculation circuit 602 selects the data bits of the output data word as given by the following hardware description (expressed in Verilog),

```
For (ii=0; ii<data_word_size; ii=ii+1) begin
    For (jj=0; jj<8; jj=jj+1)
            case ({mask_prealign_p0[ii],
            maskcomb_preins_p1[ii],
            maskcomb_postins_p1[ii]})
                3'b110: data[ii*8+jj] = data_preins_pc[ii*8+jj];
                3'b100: data[ii*8+jj] = value_ofst_pc[ii*8+jj];
                3'b101: data[ii*8+jj] = data_postins_pc[ii*8+jj];
                3'b010: data[ii*8+jj] = data_preins_cc[ii*8+jj];
                3'b000: data[ii*8+jj] = value_ofst_cc[ii*8+jj];
                3'b001: data[ii*8+jj] = data_postins_cc[ii*8+jj];
                default: data[ii*8+jj] = 1'b0
        end
    end
    where data_word_size is in bytes;
        data_preins_cc and data_post_cc are the earlier described
intermediate data words of the current cycle;
``` date_preins_pc and date_post_pc are the eariler described intermediate date words of the preceding cycle; and value_ofst_cc and value_ofst_cc are the earlier described re-aligned variants of the insert value of the current and preceding cycle respectively.

CONCLUSION AND EPILOGUE

Thus, it can be seen from the above descriptions, an improved data byte insertion circuit has been described. While the present invention has been described in terms of the foregoing embodiments, those skilled in the art will recognize that the invention is not limited to these embodiments. The present invention may be practiced with modification and alteration within the spirit and scope of the appended claims. Thus, the description is to be regarded as illustrative instead of restrictive on the present invention.

What is claimed is:

1. An apparatus for inserting one or more data bytes into a stream of data words, comprising:
    a first circuit to generate a plurality of multi-bit data bit selection masks; and
    a second circuit coupled to said first circuit to generate an output data word conditionally using selected parts of a first and a second intermediate data word generated from a first input data word of a current cycle, a third and a fourth intermediate data word generated from a second input data word of a preceding cycle, a first re-aligned variant of a first insertion data word of the current cycle, and a second re-aligned variant of a second insertion data word of the preceding cycle, in accordance with said data bit selection masks.

2. The apparatus of claim 1, wherein said first circuitry comprises a plurality of shifters, a first plurality of logical operators correspondingly coupled to selected ones of said shifters, and a second plurality of logical operators correspondingly coupled to selected ones of said first logical operators for generating said multi-bit data bit selection masks.

3. The apparatus of claim 1, wherein the apparatus is a selected one of an application specific integrated circuit, a micro-controller, a digital signal processor, a general purpose microprocessor, and a network processor.

* * * * *